United States Patent
Kalamaras

(10) Patent No.: US 6,209,740 B1
(45) Date of Patent: Apr. 3, 2001

(54) SECTORED TOOL STOW TRAY

(76) Inventor: George M. Kalamaras, 756 Palomino, Fairfield, CA (US) 94533

( * ) Notice: Subject to any disclaimer, the term of this patent is extended or adjusted under 35 U.S.C. 154(b) by 0 days.

(21) Appl. No.: 09/421,052

(22) Filed: Oct. 19, 1999

Related U.S. Application Data

(60) Provisional application No. 60/104,766, filed on Oct. 19, 1999.

(51) Int. Cl.$^7$ ....................................................... B65D 6/28
(52) U.S. Cl. .................... 220/4.26; 220/573; 220/4.03; 220/23.4; 264/239
(58) Field of Search ......................... 220/566, 573, 220/4.07, 4.03, 23.2, 24.4, 4.26, 4.27, 23.83; 264/239

(56) References Cited

U.S. PATENT DOCUMENTS

| | | | |
|---|---|---|---|
| 1,506,028 | * 8/1924 | Perritt | 220/573 |
| 3,543,287 | * 11/1970 | Henkel | 220/4.03 |
| 4,114,660 | * 9/1978 | Arruda | 220/573 |
| 4,120,119 | * 10/1978 | Engel | 220/4.26 |
| 4,682,672 | * 7/1987 | Berger et al. | 220/573 |
| 4,775,067 | * 10/1988 | Mount | 220/573 |
| 4,964,527 | * 10/1990 | Martin | 220/4.03 |
| 5,172,739 | * 12/1992 | Ristroph | 220/573 |
| 5,265,750 | * 11/1993 | Whiteley et al. | 220/4.26 |
| 5,542,347 | * 8/1996 | Joseph | 220/4.03 |
| 5,706,873 | * 1/1998 | Benoit et al. | 220/573 |

* cited by examiner

Primary Examiner—Joseph M. Moy
(74) Attorney, Agent, or Firm—Harold D. Messner

(57) ABSTRACT

The present invention relates to a portable tray for placement atop a conventional oil drain barrel assembly in which the tray comprises three separate but interchangeable sector elements that are each preferably formed by a plastic extrusion process, disconnectably connected to each other using conventional fasteners, such as nut-bolt combinations, about the top edge of such drain barrel assembly. Result: the tray is exceedingly convenient for stowing tools and fasteners associated with conventional oil draining operations but can be retrofitted for use with any conventional oil drain assembly irrespective of the diameter of its drain pan.

17 Claims, 10 Drawing Sheets

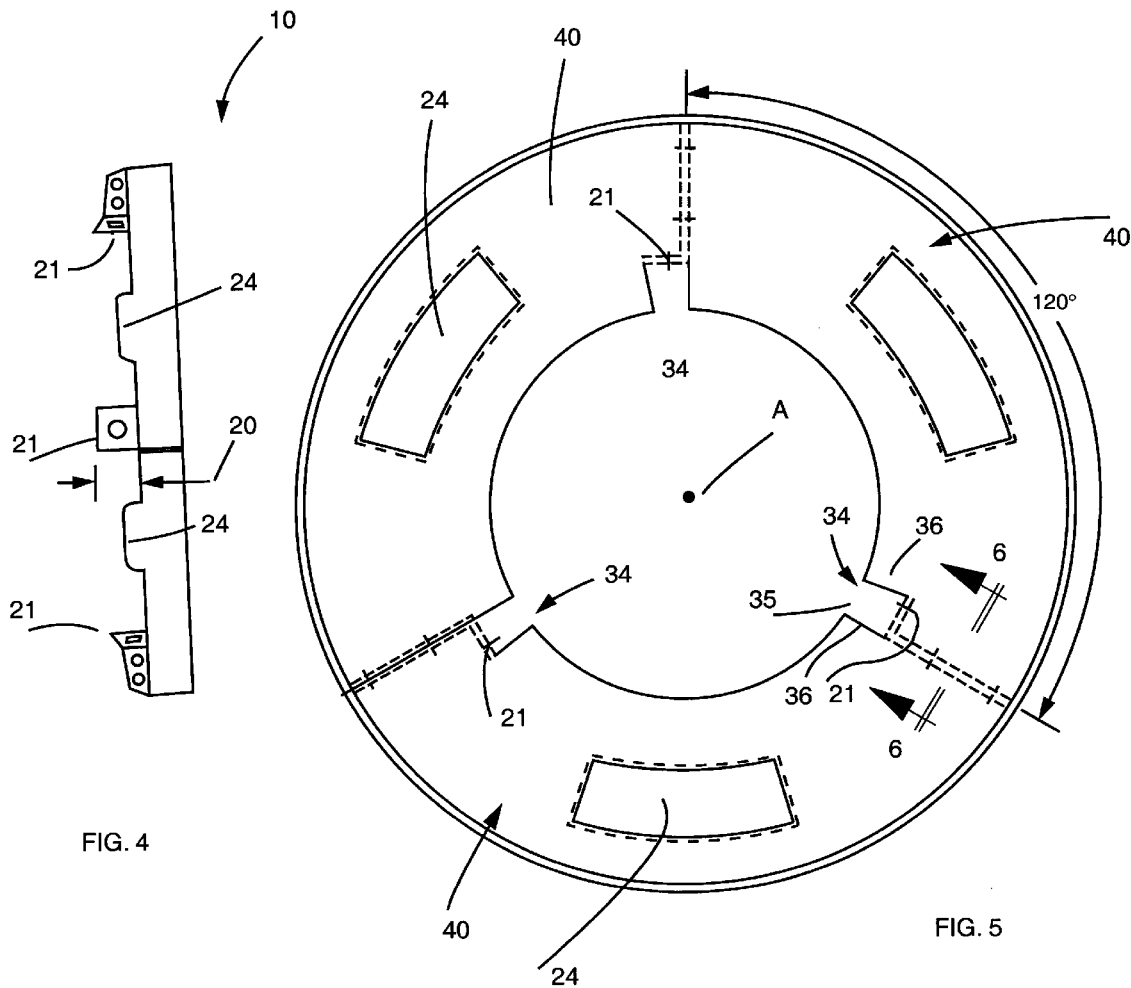
FIG. 4
FIG. 5
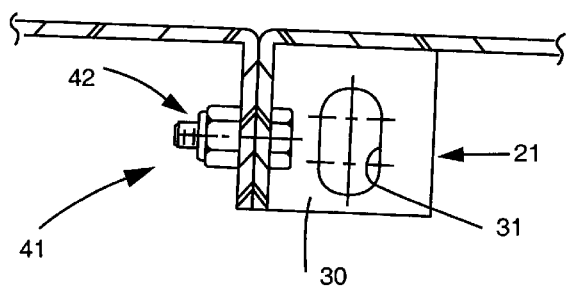
FIG. 6

SECTORED TOOL STOW TRAY

This application claims benefit of Provisional Appl. Ser. No. 60/104,766 filed Oct. 19, 1999.

SCOPE OF THE INVENTION

The present invention relates to a portable tray for placement atop a conventional oil drain barrel assembly including a telescoping drain pan and more particularly to such a tray in which the same has been manufactured as three separate but interchangeable sectors that are each preferably formed by a plastic extrusion process and then assembled together using conventional fasteners, such as nut-bolt combinations about the top edge of such drain barrel assembly. Result: the tray is exceedingly convenient for stowing tools and fasteners associated with conventional oil draining operations but can be retrofitted for use with any conventional oil drain assembly irrespective of the diameter of the drain pan thereof.

BACKGROUND OF THE INVENTION

The prior art is replete with trays for used in the automobile industry but I am unaware of a sectored tray that can be retrofitted for use with any conventional oil drain assembly irrespective of the diameter of the drain pan thereof.

SUMMARY OF THE INVENTION

The present invention relates to a portable tray for placement atop a conventional oil drain barrel assembly in which the tray comprises three separate but interchangeable sector elements that are each preferably formed by a plastic extrusion process, disconnectably connected to each other using conventional fasteners, such as nut-bolt combinations, about the top edge of such drain barrel assembly. Result: the tray is exceedingly convenient for stowing tools and fasteners associated with conventional oil draining operations but can be retrofitted for use with any conventional oil drain assembly irrespective of the diameter of its drain pan.

BRIEF DESCRIPTION OF THE DRAWINGS

FIG. 4 is a side view of the tray of the invention;

FIG. 5 is an enlarged top view of the tray of the invention;

FIG. 6 is a partial section taken along line 6—6 of FIG. 5;

DETAILED DESCRIPTIONS OF THE INVENTION

Figure 1:
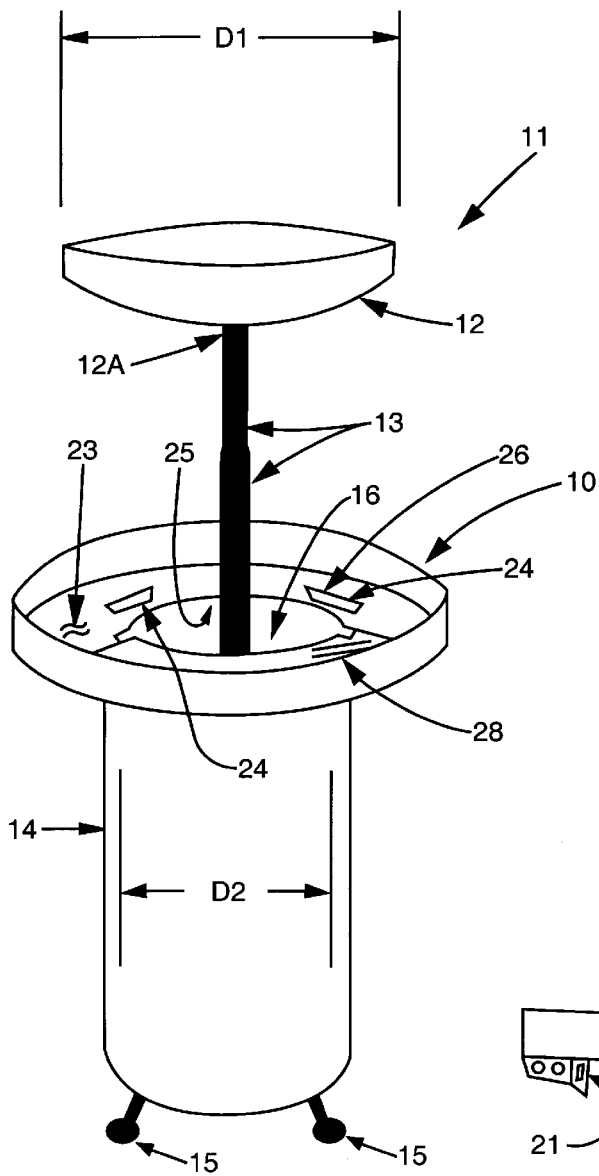
FIG. 1 is a perspective view of the tray of the invention atop a conventional oil drain barrel assembly.

Referring to FIG. 1, tray 10 of the invention, is shown atop a conventional oil drain barrel assembly 11. The oil drain barrel assembly 11 includes a drain pan 12 of a maximum diameter D1, telescoping cylindrical support members 13 and a stowing barrel 14 having casters 15. In operations, the drain pan 12 is raised upward to the source of the oil to be gathered using the telescoping support members 13 attached to apex 12a of the drain pan 12. Oil falls by gravity through the pan 12, the telescoping support members 13 and thence into cavity 16 of the stowing barrel 14.

Figure 2:
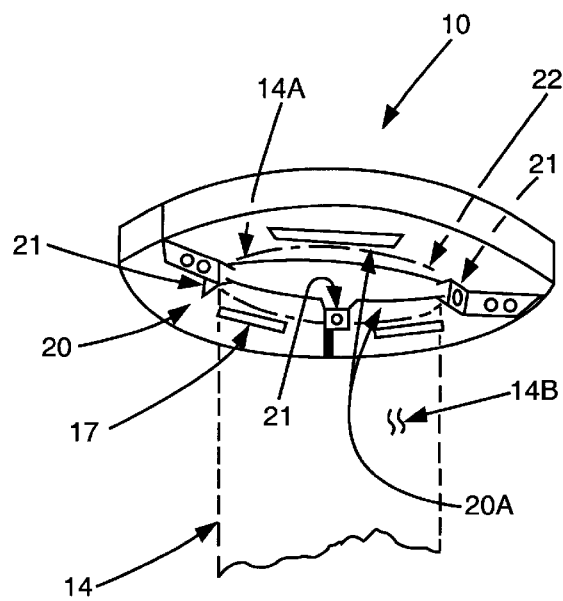
FIG. 2 is a detail bottom perspective view of the tray of the invention showing attachment to the barrel of the oil drain barrel assembly of FIG. 1.

Briefly, the tray 10 of the invention has interior broad surface 20 (see FIG. 2) fitted with downwardly depending ears 21 which forms a receiving zone 22 for upper region 17 of the stowing barrel 14. That is, the ears 21 of the tray 10 extend downward over end edge 14a adjacent to side wall 14b of the barrel 14. Arcuate regions 20a of the interior broad surface 20 contact three separate portions 17 of the end edge 16 of the barrel 14. Returning to FIG. 1, the tray 10 also has an exterior broad surface 23 fitted with pockets 24 and a central opening 25 of circular cross section defining a diameter D2 where D2 is less than D1. The purpose of pockets 24: form repositories for fasteners, bolts, cotter pins and the like, such as nuts 26. Note also the broad surface 23 of the tray 10 can also form a receiving area for stowing of tools such as wrench 28.

FIGS. 3–6 show the tray 10 of the invention in more detail.

Figure 3:
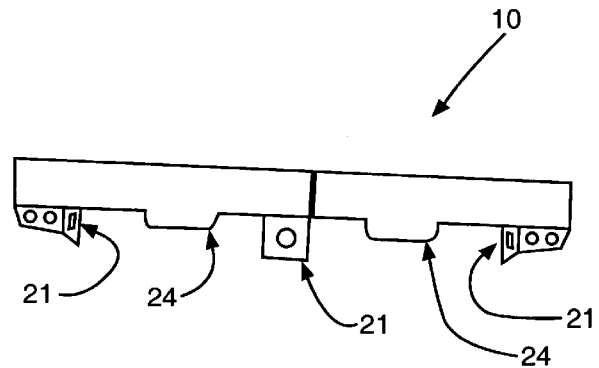
FIG. 3 is a front view of the tray of the invention.
Figure 7:
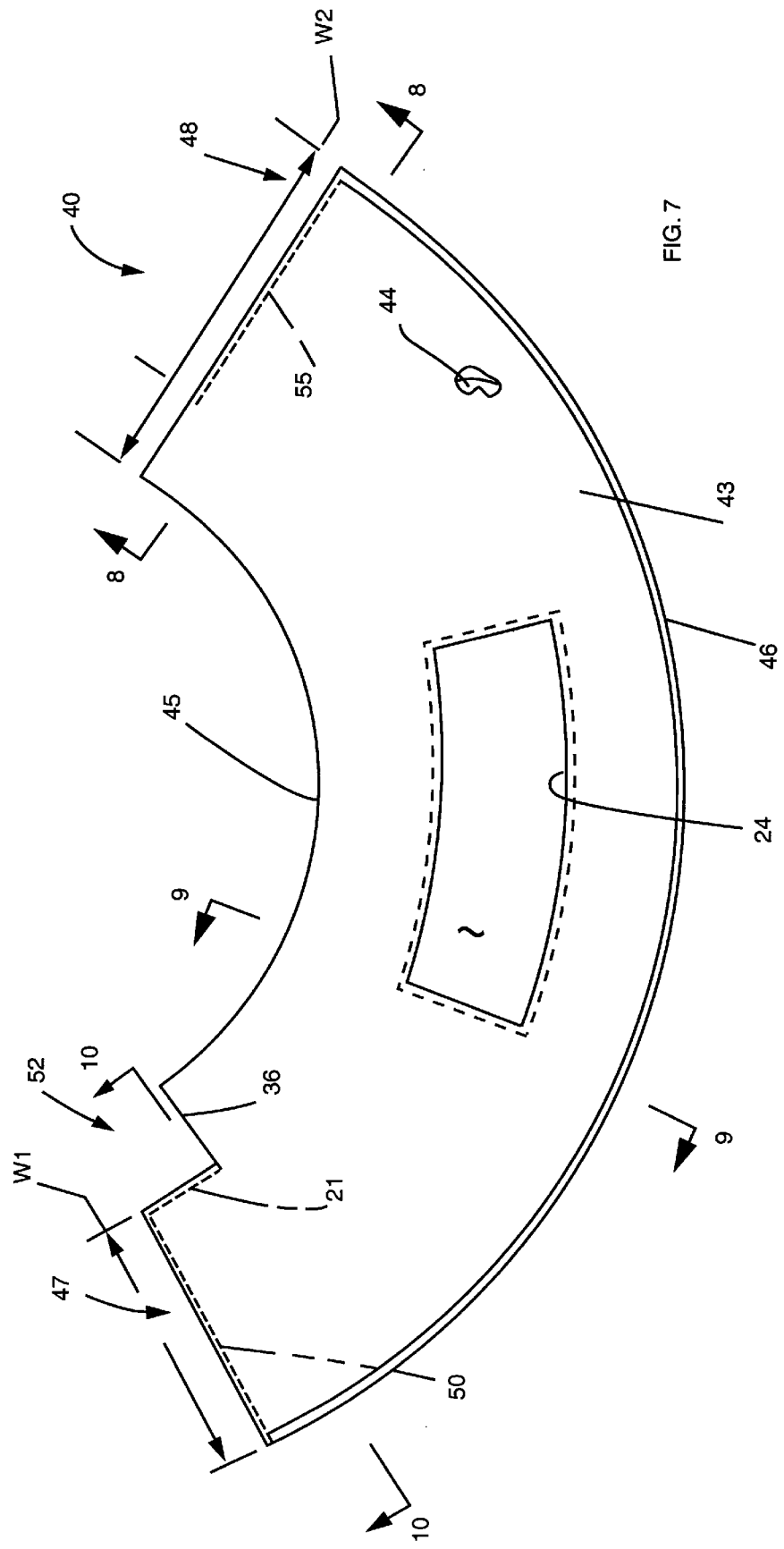
FIG. 7 is a top view of a detailed sector element used to form the tray of the invention, such element being produced by an extrusion process.
Figure 8:
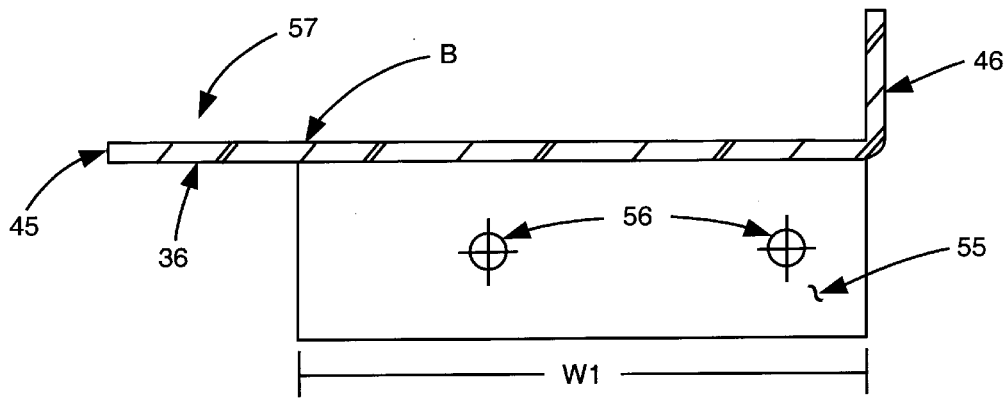
FIG. 8 is a section taken along line 8—8 of FIG. 7.
Figure 9:
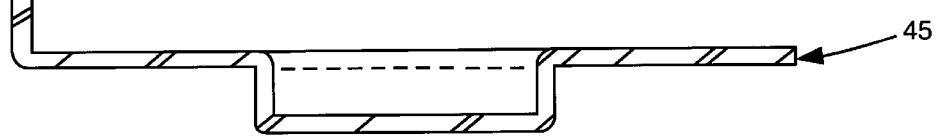
FIG. 9 is a section taken along line 9—9 of FIG. 7.
Figure 10:
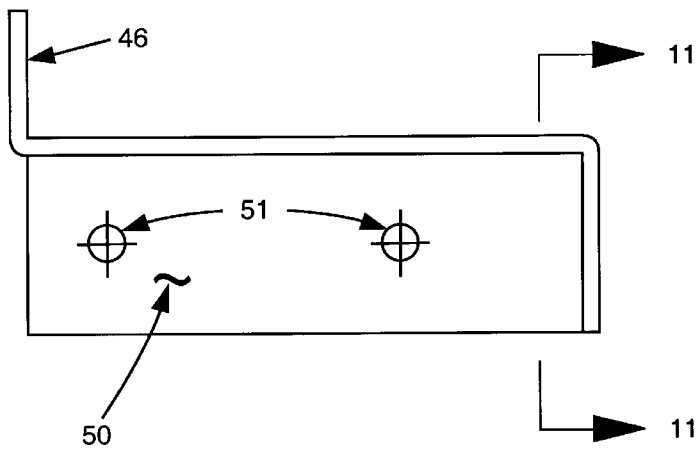
FIG. 10 is a section taken along line 10—10 of FIG. 7.
Figure 11:
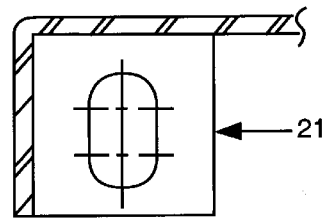
FIG. 11 is a section taken along line 11—11 of FIG. 10.

As shown in FIGS. 3 and 4, each of the downwardly depending ears 21 are seen to be rectangular in cross section and has a broad surface 30 penetrated by an opening 31. The depth Do of each ear 21 is seen to be greater than that of each pocket 24. As shown in FIGS. 5 and 6, the ears 21 face the axis of symmetry A of the tray 10 and are 120 degrees from each other as are notch assemblies 34. Each notch assembly 34 is open at end 35 and includes side ends 36 adjacent to ear 21. Note that the tray 10 is divided into three sector elements 40 attached together by tab assemblies 41 including nut-bolt combinations 42.

FIGS. 7–11 show an individual sector element 40 used to form the tray 10 of the invention in more detail.

As shown, each sector element 40 has broad upper surface 43 and lower surface 44, an inner arcuate edge 45, upwardly extending outer arcuate ridge 46 extending above the upper broad surface 43 and first and second end regions 47, 48 spaced apart 120 degrees. Pocket 24 is mid-way between the first and second end regions 47, 48.

The configuration of the first and second end regions 47, 48 is not the same. The width W1 of the first end region 47 is less than W2 of the second end region 48 but includes a downwardly directed tab 50 running the full length of the first end region 47 having a pair of openings 51. Termination of the first end region 47 is at L-shaped section 52. The L-shaped section 52 includes the downwardly depending ear 21 previously mentioned as well as includes the side end 36 of the notch assembly 34 (FIG. 5) also previously mentioned.

The second end region 48 includes a downwardly directed tab 55 having openings 56 and a width W1 beginning at arcuate ridge 46 and terminating at point B of a stub region 57. The stub region 57 includes the side end 36 of the notch assembly 34 (FIG. 5).

MANUFACTURE AND ASSEMBLY

Figure 12:
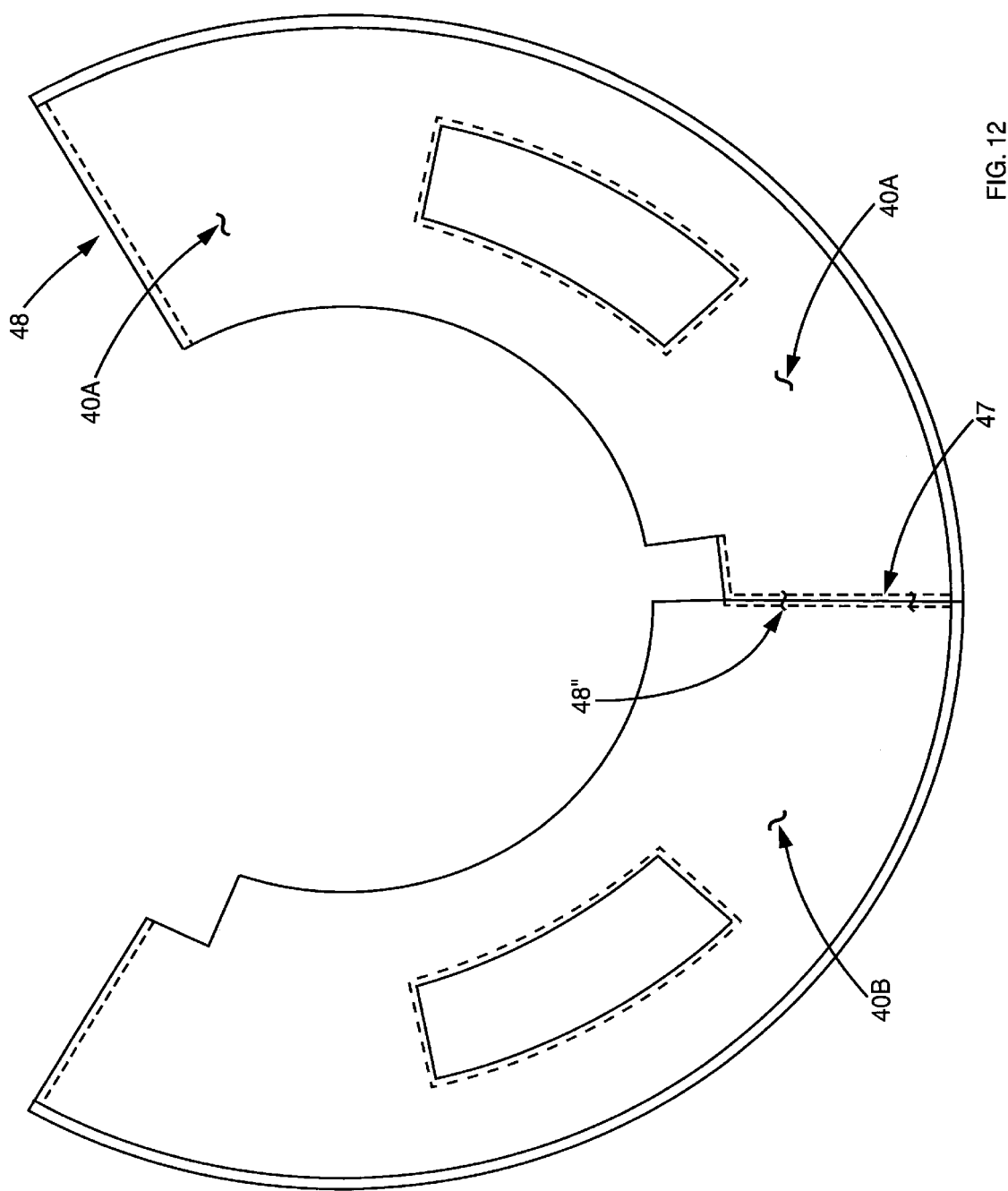
FIG. 12 is a partial detail top view of two sector elements.
Figure 13:
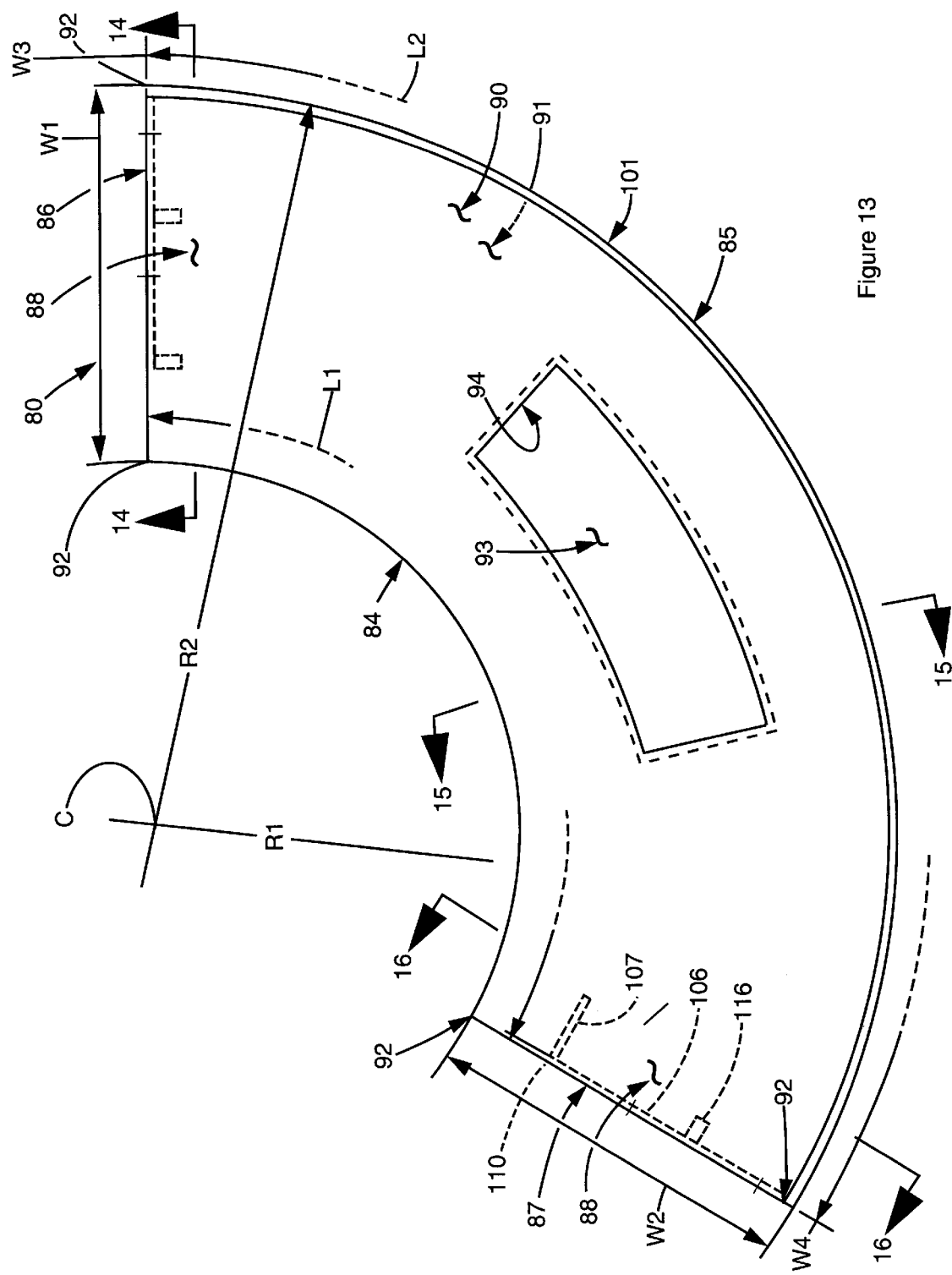
FIG. 13 is a top view of an improved sector used to form the tray of the invention.
Figure 14:
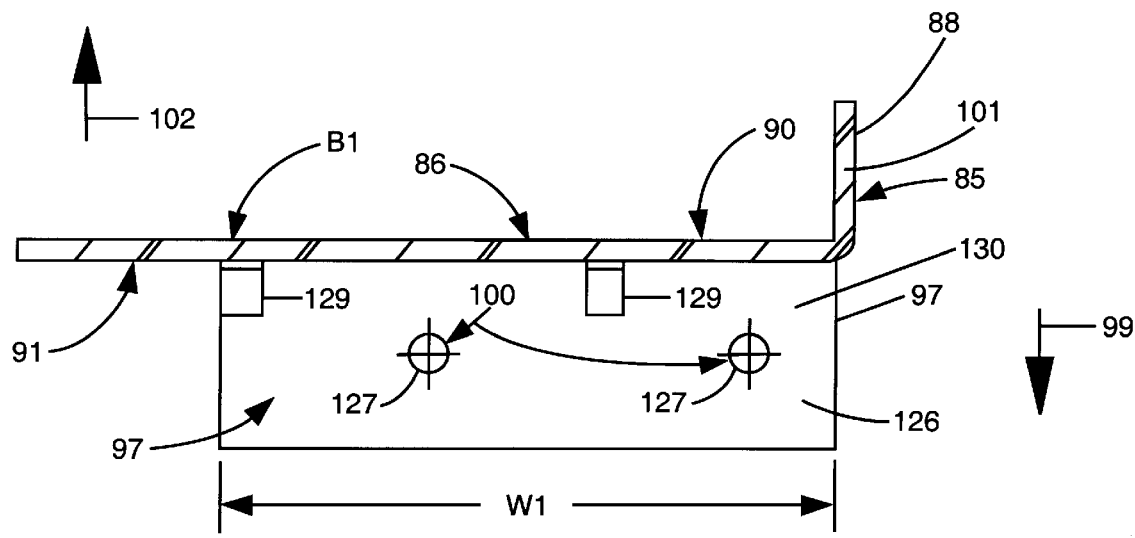
FIG. 14 is a section taken along line 14—14 of FIG. 13.
Figure 15:
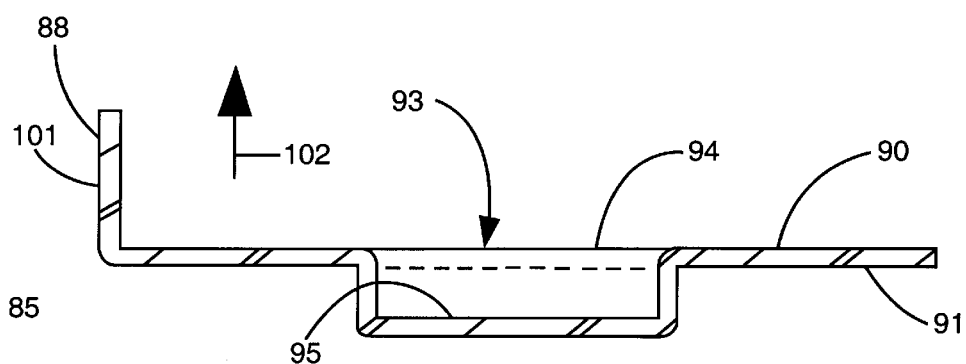
FIG. 15 is a section taken along line 15—15 of FIG. 13.
Figure 16:
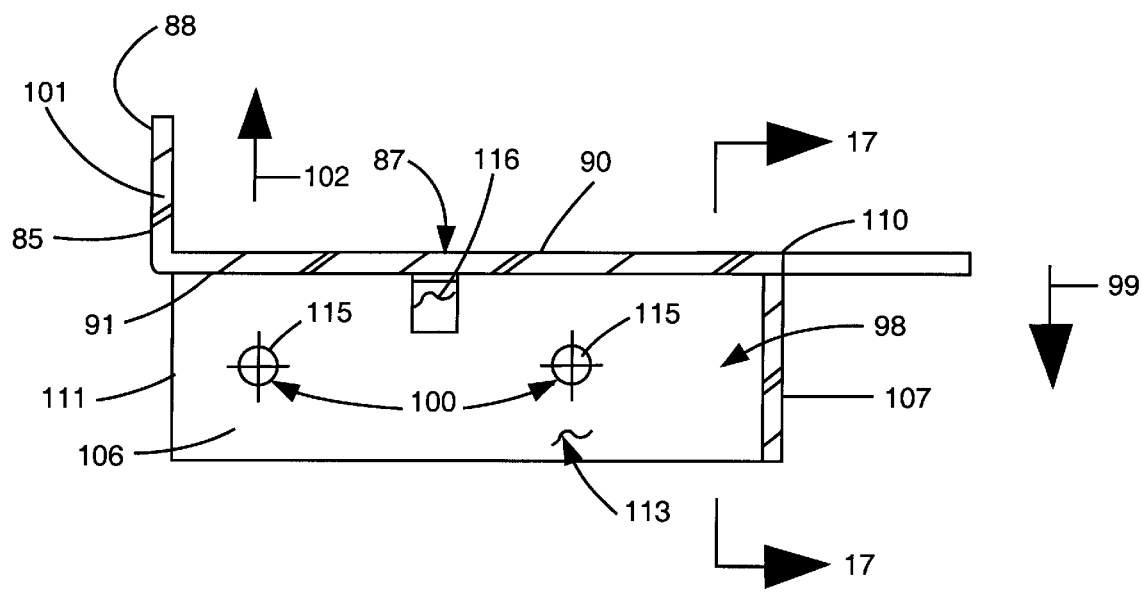
FIG. 16 is a section taken along line 16—16 of FIG. 13.
Figure 17:
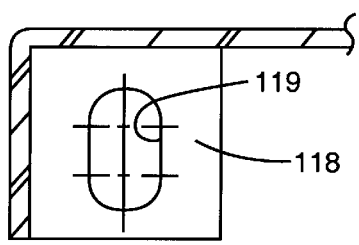
FIG. 17 is a section taken along line 17—17 of FIG. 13.

Note that the individual sector element 40 of FIGS. 7–11 is used in combination with two additional sector elements 40 to form the tray 10 of the invention. In more detail, the first end region 47 of one of the sector elements say sector element 40a of FIG. 12, is aligned with the second end region 48 of a second sector element 40b. After such alignment has been completed, the tab assembly 41 of FIG. 6 is formed and then semi-fixed via the nut-bolt combination 42 fitted through the openings 51, 56 see FIGS. 8, 10. The process is then repeated using a third sector 40 not shown.

While each sector element 40 can be formed by various processes and of different materials, a preferred process is via plastic extrusion using a high-impact plastic as the source material. In that way, cost of each tray 10 of the invention can be reduced over time with minimum expenditure of money.

Various modifications and changes are apparent to those skilled in the art from a reading of the foregoing description.

MODIFICATION

Figure 18:
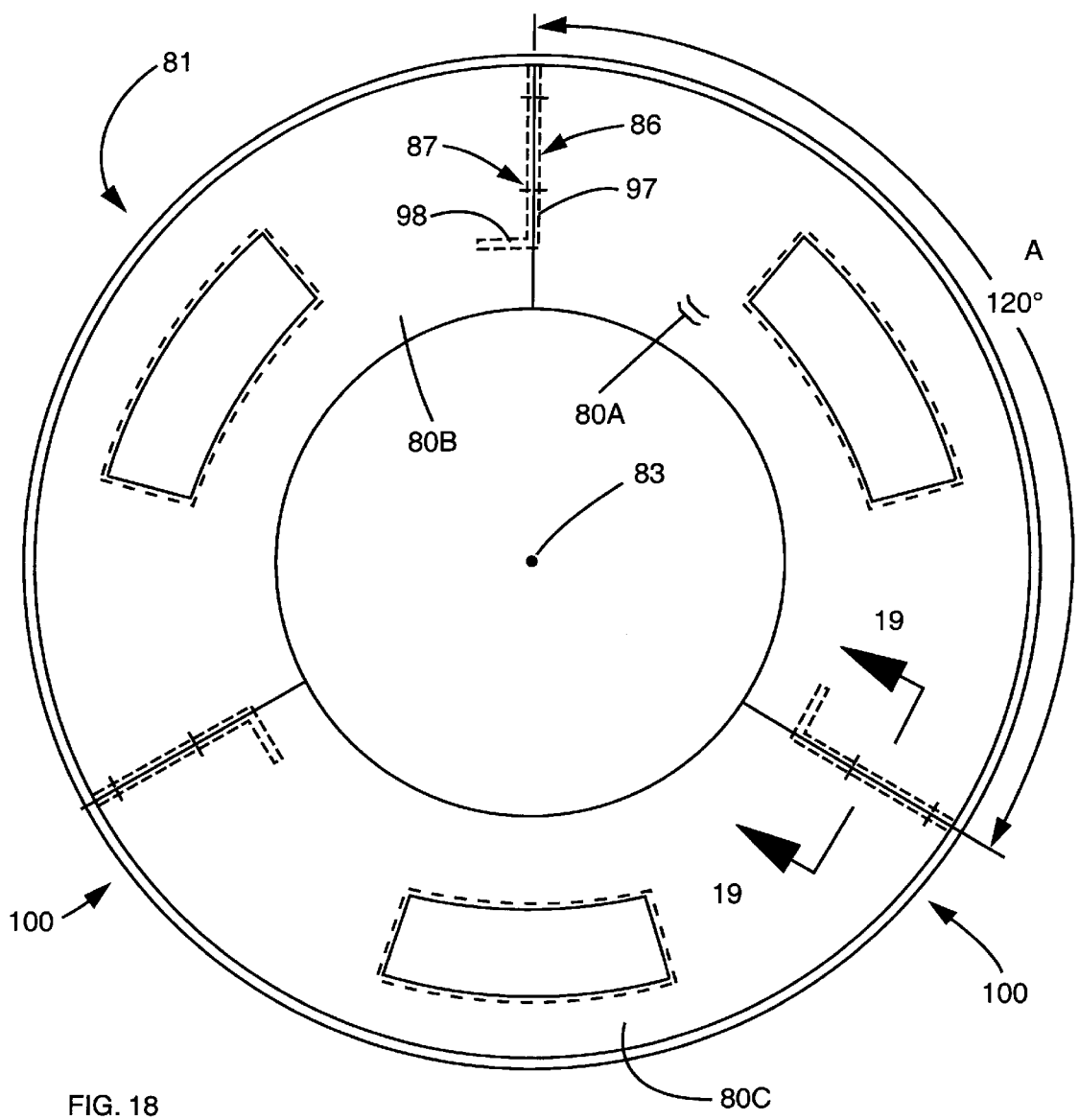
FIG. 18 is a detail top view of three attached sectors.

FIGS. 13–19 show an improved individual, pie-shaped truncated sector 80 used to form an improved, partial annular segmented tray 81 of FIG. 18 having an axis of symmetry 83 for placement atop the conventional oil drain barrel assembly of FIG. 1. Briefly the tray 81 comprises three of the separate but interchangeable, truncated, plastic pie-shaped sectors 100 assembled to each other to define axis of symmetry 83 of the full tray 81.

As shown, each sector 80 includes integral inner and outer arcuate radial edge portions 84, 85 that are defined by the following:

(i) a common center of formation C exterior thereof coincident with the axis of symmetry 83; radii R1 and R2, respectively sourced at the center of formation C1; and (ii) transverse radial lengths L1 and L2, respectively normal to the radii R1 and R2, where R2>R1 and L2>L1.

In addition each sector 80 also includes the following:

(i) integral first and second truncated, planar side portions 86, 87 having transverse, parallel side surfaces 88 defining separate but intersecting first and second working planes W3 and W4, respectively, defining an angle A therebetween, where A is preferably 120 degrees, see FIG. 18;

(ii) integral first and second planar broad longitudinal surfaces 90, 91 terminating at the inner and outer radial edge portions 84, 85 and the first and second planar side portions 86, 87 at corners 92, (iii) a pocket 93 formed mid-way between the first and second truncated, planar side portions 86, 87. The pocket 93 includes an opening 94 in alignment with broad planar first surface 90 and a floor 95 extending beyond second planar broad surface 91.

Note that the integral first and second planar side portions 86, 87 include integral first and second upright extensions 97, 98, respectively, extending from the second planar longitudinal broad surface 91 in a first direction 99. Also, each of the integral first and second upright extensions 97, 98 includes opening means generally indicated at 100 whereby three of separate interchangeable, truncated pie-shaped sectors 80 can be disconnectably connected to each other about a conventional oil drain barrel assembly as shown in FIG. 1 for the purpose of stowing tools and fasteners associated with conventional oil draining operations thereon.

Each sector 80 also includes a ridge 101 formed at outer radial edge portion 85 that beyond the broad planar first surface 90 in a second direction 102 opposite to the first direction 99. Purpose: secure items from falling off the first surface 90 during usage.

The configuration of the first and second planar side portions 86, 87 is substantially the same wherein the width W1 of the first side portion 86 is about equal to the width W2 of the second planar side portion 87.

In addition note that the first planar side portion 87 includes the upright L-shaped extension 98 including a first leg 106 running about ¾ of the full length thereof and a terminating second leg 107 normal to and integrally connected to the first leg 106 at corner 110. Note that the first leg 106 is seen to have an outer end 111 that integrally attaches to the outer radial edge portion 85 in alignment with the outer arcuate ridge 101 as well as to have a broad surface 113 through which a first set or pair of openings 115 extend, such openings 115 comprising a part of opening means 100 previously described.

Note that broad surface 113 is also provided a central located triangular gusset 116 integrally connected to planar broad second surface 91. Likewise, the second leg 107 includes a broad surface 118 through which a slot 119 extends. The second leg 107 defines the downwardly depending ear 21 previously mentioned but note that the notch assembly 34 (FIG. 5) also previously mentioned, is omitted in the above described embodiment.

The second planar side portion 86 includes an upright extension 97 having a broad surface 126 through which openings 127 extend (that are also a part of opening means 100 previously mentioned) and a width W1 beginning at arcuate ridge 101 and terminating at point B' about ¾ of the full width of the second side portion 86. The extension 97 includes a pair of triangularly shaped gussets 129 integrally connected to the second broad longitudinal surface 91. In addition the extension 97 includes a broad surface 130 through which the second pair or set of openings 127 extend, such openings 127 comprising a part of opening means 100 previously mentioned.

MANUFACTURE AND ASSEMBLY OF THE MODIFICATION

Figure 19:
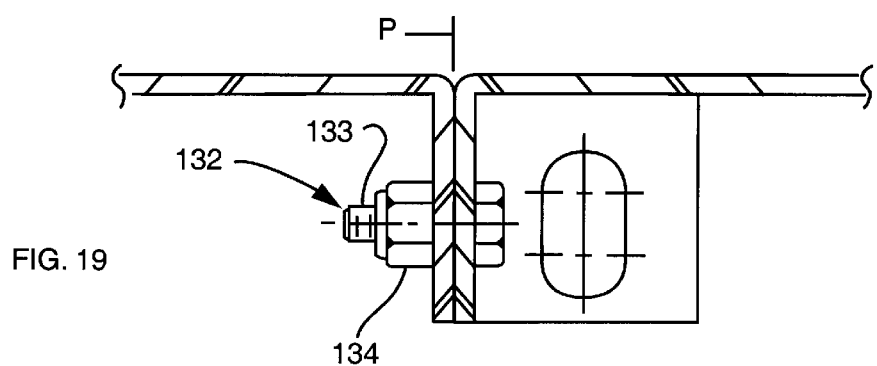
FIG. 19 is a section taken along line 19—19 of FIG. 18.

Note that the individual sector 80 of FIGS. 13–19 is used in combination with two additional sectors 80 to form the partial tray 81 of the FIG. 18. In more detail, the first planar side portion 86 including first upright extension 97 of one of the sectors 80, say sector 80a of FIG. 19 is aligned with a second planar side portion 87 including second upright extension 98 of a second sector 80b. After such alignment has been completed, an extension assembly 132 is formed wherein openings 115 and 127 are aligned and then bolts 133 extends (i) through the first set of openings 115 of the first upright extension 98 of the sector 80a and (ii) through the second set of openings 127 of the second upright extension 97 of the neighboring pie-shaped sector 80b, and nuts 134 are threadably engaged to the bolts 133 to disconnectably connect the truncated pie-shaped sectors 80a and 80b together along a plane of combination P that is coincident the first and second working planes W3 and W4 previously mentioned. The process is then repeated using a third sector 80c shown in phantom line.

That is to say, the method of assembly of the invention included the steps of:

(i) orienting the first set of openings 127 of the first upright extension 97 of one of the truncated pie-shaped sectors, viz., sector 80a into axial alignment with the second set of openings 115 of the second upright extension 98 of another neighboring truncated pie-shaped sector, viz., sector 80b, (ii) inserting bolts 133 through the axially aligned first and second sets of openings 115 and 127, (iii) attaching nuts 134 to the bolts 133 to disconnectably connect the aforementioned truncated pie-shaped sectors 80a, 80b together along plane of combination P that is coincident with the first and second working planes W3 and W4 associated with the sectors 80a and 80b.

Thereafter, the process is repeated for a third sector 80c with similar results. That is, the steps (i)–(iii) are repeated for attaching a third, truncated pie-shaped sector 80c to the aforementioned truncated pie-shaped sectors 80a and 80b and thereby forming the annular tray 81 of FIG. 18 for use about a conventional oil drain barrel assembly for stowing tools and fasteners associated with conventional oil draining operations.

Figure 20:
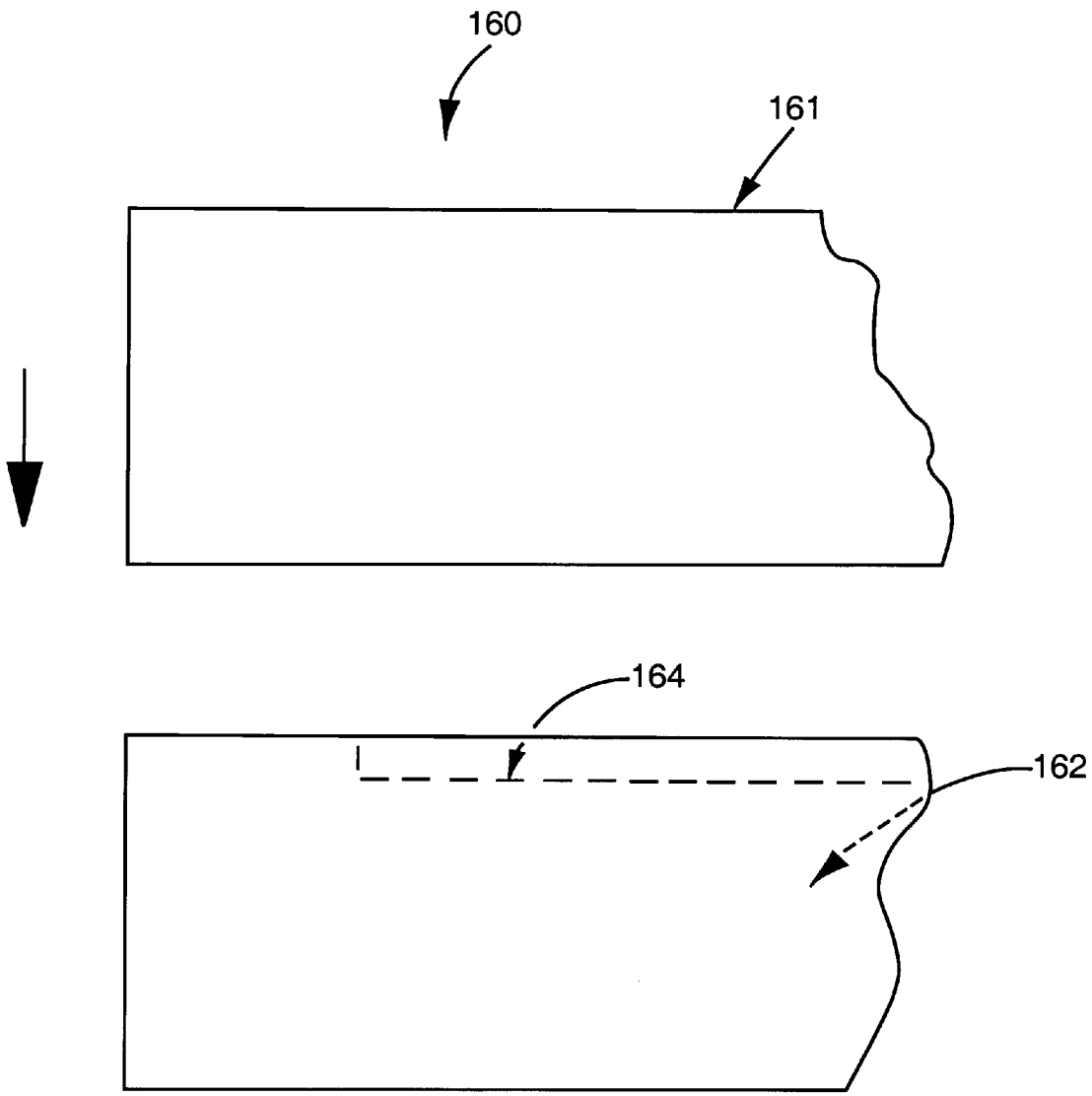
FIG. 20 is a mold for making the sector of FIG. 13.

FIG. 20 shows a mold 160 consisting of an upper half 161 and a lower half 162 having a broad upper surface 163 indented with a valley 164 in the form of a truncated pie-shaped sector as previously described. The upper half 161 has a inlet tube (not shown) for allowing liquid plastic to flow into and fill the valley 164 after the upper half 161 has been attached to the lower half 162.

The article of manufacture produced by the mold 160 of FIG. 20 is as pictured in FIGS. 13–19. Note that thereafter the process is thrice repeated wherein the articles of manufacture thus produced have shapes and characteristics as previously described.

That is to say, the method of the invention for making the interchangeable, truncated pie-shaped sector 80a, 80b or 80c uses a single mold 160 and comprises the steps of:

(i) designing a mold 160 that provides the shape and characteristics as previously described, (ii) flowing high impact plastic into the mold 160, (iii) removing the product from the mold 160.

Note that the scope of the invention thus is to be determined based on the following claims of record.

What is claimed is:

1. An annular segmented tray for placement atop a conventional oil drain barrel assembly comprising three separate but interchangeable, truncated, plastic pie-shaped sectors assembled to define a common axis of symmetry each including integral inner and outer arcuate radial edge portions defined by a common center of formation exterior thereof coincident with said axis of symmetry, radii R1 and R2, respectively sourced at said center of formation and transverse radial lengths L1 and L2, respectively normal to said radii R1 and R2, where R2>R1 and L2>L1; integral first and second truncated, planar side portions having transverse, parallel side surfaces defining separate but intersecting first and second working planes defining an angle A therebetween; integral first and second planar surfaces terminating at said inner and outer radial edge portions and said first and second planar side portions at corners; said integral first and second planar side portions including integral first and second upright extensions, respectively, extending from said second broad surface in a first direction, each of said integral first and second upright extensions including opening means whereby said three separate interchangeable, truncated pie-shaped sectors can be disconnectably connected to each other about a conventional oil drain barrel assembly for the purpose of stowing tools and fasteners associated with conventional oil draining operations thereon.

2. The annular segmented tray of claim 1 in which angle A is about 120 degrees.

3. The annular segmented tray of claim 2 in which said integral first and second planar surfaces are normal to said working planes of said transverse, parallel side surfaces of said first and second end portions.

4. The annular segmented tray of claim 3 with the addition of an integral pocket formed in and extending through said first and second planar surfaces having an opening in longitudinal alignment with said first planar surface and a floor extending beyond said second broad surface in said first direction.

5. The annular segmented tray of claim 4 in which said first upright extension is L-shaped and includes a first leg positioned in coincidence with said first working plane and a second leg normal thereto forming a depending ear for each of said truncated, pie-shaped sectors, and in which said second upright extension is a rectangular solid positioned to be coincident with said second working plane.

6. The annular tray of claim 5 in which said opening means comprise a first set of openings through said first leg of said first upright extension and a second set of openings through said second upright extension.

7. The annular tray of claim 6 with the addition of three sets of fasteners for said three separate interchangeable, truncated pie-shaped sectors wherein each set of fasteners includes a bolt extending (i) through said first set of openings of said first upright extension of one of said truncated pie-shaped sectors and (ii) through said second set of opening of said second upright extension of another, neighboring said truncated pie-shaped sector, and a nut threadably engaged said bolt to disconnectably connect said one and said another truncated pie-shaped sectors together along a plane of combination that is coincident with said first and second working planes thereof.

8. The annular tray of claim 4 wherein said pocket includes radial sides having a center of formation coincident with that of said inner and outer arcuate radial edge portions.

9. The annular tray of claim 5 with the addition of an integral ridge integrally connected to said outer arcuate radial edge portion and extending from second broad surface in a second direction opposite to said first direction.

10. For use in forming a tray for placement atop a conventional oil drain barrel assembly having a common axis of symmetry, an article of manufacture comprising a pie-shaped, truncated plastic sector including integral inner and outer arcuate radial edge portions defined by a common center of formation exterior thereof coincident with said axis of symmetry, radii R1 and R2, respectively sourced at said center of formation and transverse radial lengths L1 and L2, respectively normal to said radii R1 and R2, where R2>R1 and L2>L1; integral first and second truncated, planar side portions having transverse, parallel side surfaces defining separate but intersecting first and second working planes defining an angle A therebetween; integral first and second planar surfaces terminating at said inner and outer radial edge portions and said first and second planar side portions at corners; said integral first and second planar side portions including integral first and second upright extensions, respectively, extending from said second broad surface in a first direction, each of said integral first and second upright extensions including opening means whereby said three separate articles of manufacture can be disconnectably connected to each other.

11. The article of manufacture of claim 10 in which said first upright extension is L-shaped and includes a first leg positioned in coincidence with said first working plane and a second leg normal thereto forming a depending ear for each of said truncated, pie-shaped sectors, and in which said second upright extension is a rectangular solid positioned to be coincident with said second working plane.

12. The article of manufacture of claim 11 in which said opening means comprise a first set of openings through said first leg of said first upright extension and a second set of openings through said second upright extension.

13. The article of manufacture of claim 11 with the addition of an integral pocket formed in and extending through said first and second planar surfaces having an opening in longitudinal alignment with said first planar surface and a floor extending beyond said second broad surface in said first direction.

14. The article of manufacture of claim 13 with the addition of an integral ridge integrally connected to said outer arcuate radial edge portion and extending from second broad surface in a second direction opposite to said first direction.

15. A method of assembling a tray for placement atop a conventional oil drain barrel assembly in which the tray includes three separate but interchangeable, truncated pie-shaped sectors when assembled together defining a common axis of symmetry, each sector being formed by plastic extrusion and including integral inner and outer arcuate radial edge portions defined by a common center of formation exterior thereof coincident with said axis of symmetry, radii $R1$ and $R2$, respectively sourced at said center of formation and transverse radial lengths $L1$ and $L2$, respectively normal to said radii $R1$ and $R2$, where $R2>R1$ and $L2>L1$; integral first and second truncated, planar side portions having transverse, parallel side surfaces defining separate but intersecting first and second working planes defining an angle A therebetween; integral first and second planar surfaces terminating at said inner and outer radial edge portions and said first and second planar side portions at corners; said integral first and second planar side portions including integral first and second upright extensions, respectively, extending from said second broad surface in a first direction, each of said integral first and second upright extensions including opening means whereby said three separate interchangeable, truncated pie-shaped sectors can be disconnectably connected to each other about a conventional oil drain barrel assembly for the purpose of stowing tools and fasteners associated with conventional oil draining operations thereon, said first upright extension being L-shaped and including a first leg positioned in coincidence with said first working plane and a second leg normal thereto forming a depending ear for each of said truncated, pie-shaped sectors, and in which said second upright extension is a rectangular solid positioned to be coincident with said second working plane, said opening means comprising a first set of openings through said first leg of said first upright extension and a second set of openings through said second upright extension, comprising the steps of:

(i) orienting said first set of openings of said first upright extension of one of said truncated pie-shaped sectors into axial alignment with said second set of openings of said second upright extension of another neighboring said truncated pie-shaped sector, (ii) inserting bolts through said axially aligned first and second sets of openings, (iii) attaching nuts to said bolts to disconnectably connect said one and said another truncated pie-shaped sectors together along a plane of combination that is coincident with said first and second working planes thereof.

16. The method of claim 15 with the additional step of repeating steps (i)–(iii) for attaching a third, truncated pie-shaped sector to said one and said another pie-shaped sectors and thereby forming an annular tray for use about a conventional oil drain barrel assembly for stowing tools and fasteners associated with conventional oil draining operations.

17. A method of making an interchangeable, truncated pie-shaped sector using a single mold for forming an annular tray for use about a conventional oil drain barrel assembly for stowing tools and fasteners associated with conventional oil draining operations, (i) designing a mold the provides a product having integral inner and outer arcuate radial edge portions defined by a common center of formation exterior thereof coincident with said axis of symmetry, radii $R1$ and $R2$, respectively sourced at said center of formation and transverse radial lengths $L1$ and $L2$, respectively normal to said radii $R1$ and $R2$, where $R2>R1$ and $L2>L1$; integral first and second truncated, planar side portions having transverse, parallel side surfaces defining separate but intersecting first and second working planes defining an angle A therebetween; integral first and second planar surfaces terminating at said inner and outer radial edge portions and said first and second planar side portions at corners; said integral first and second planar side portions including integral first and second upright extensions, respectively, extending from said second broad surface in a first direction, said first upright extension being L-shaped and including a first leg positioned in coincidence with said first working plane and a second leg normal thereto forming a depending ear for each of said truncated, pie-shaped sectors, and in which said second upright extension is a rectangular solid positioned to be coincident with said second working plane, comprising the steps of:

(ii) flowing high impact plastic into said mold, (iii) removing said product from said mold.

* * * * *